Aug. 12, 1969     J. H. EAGLE     3,460,449
APPARATUS FOR FILM TYPE IDENTIFICATION FOR FILM THAT
IS TRANSFERRED FROM ONE MAGAZINE INTO ANOTHER DURING
THE EXPOSURE PROCESS
Filed Oct. 5, 1966

JOHN H. EAGLE
INVENTOR.

BY Malcolm J. Dunn
Robert W Hampton
ATTORNEYS

3,460,449
APPARATUS FOR FILM TYPE IDENTIFICATION FOR FILM THAT IS TRANSFERRED FROM ONE MAGAZINE INTO ANOTHER DURING THE EXPOSURE PROCESS

John H. Eagle, Rochester, N.Y., assignor to Eastman Kodak Company, Rochester, N.Y., a corporation of New Jersey
Filed Oct. 5, 1966, Ser. No. 584,571
Int. Cl. G03b 17/00, 17/26
U.S. Cl. 95—1                    5 Claims

ABSTRACT OF THE DISCLOSURE

Apparatus for identifying film contained within a film cartridge including a notch or other easily sensed mark in a predetermined location on the free end of the film, the notch cofunctioning with indicia arranged on the cartridge to indicate the type of film contained therein.

---

This invention relates to the identification of photographic film coiled within a cartridge.

Film supplied in a cartridge is usually identified by means of wording either on the cartridge or on a label affixed to the cartridge. However, if the film is transferred to another cartridge without rewinding the film into its original supply cartridge after exposure has been completed in the camera, such method of identification is inadequate, unless the take-up cartridge is provided with some means which can readily identify the exposed film contained therein.

When film is transferred from a supply cartridge to an independent take-up cartridge during the exposure process, the supply cartridge may later be used as the independent take-up cartridge for the next roll of film exposed in the camera. A shortcoming of this system is that the existing wording on the cartridge is able to identify only one type of film, so that a different set of cartridges having the appropriate wording would be required for each type of film.

Hence, a film identifying system is required which enables ready identification of the film contained in cartridges that are capable of holding a variety of types of film of the same size. Then, instead of requiring a variety of cartridges provided with different labels for each of the types of film to be loaded therein, the film manufacturer could reduce this variety to one standard cartridge for each size film. Thus, the variety of cartridges which would normally be manufactured and stockpiled would be greatly reduced. Likewise, a photographer would be able to use standard film cartridges interchangeably with various types of film, and to recognize the cartridge contents. Similarly, the film processor would be able to identify the exposed film in the take-up cartridge so that he will use the correct processing procedure; and the cartridge could be reloaded with numerous types of film, provided the cartridge had not been rendered useless during the film removal operation.

An object of the present invention is to provide indicia on the surface of a film cartridge and means on a film in the cartridge that co-function to identify to the photographer the film that is loaded in the cartridge.

Other objects and advantages will be apparent to those skilled in the art from the following description.

Reference is now made to the accompanying drawings wherein like reference numerals designate like parts and wherein.

Figures 1, 2:
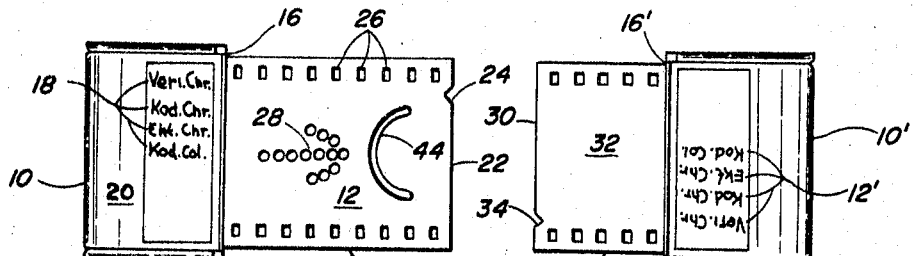
FIG. 1 is a plan view of the preferred embodiment of the invention showing a standard film supply cartridge and a free end portion of a film extending therefrom.
FIG. 2 is a plan view of the preferred embodiment showing another standard cartridge similar to that shown in FIG. 1, used as a take-up cartridge.
Figures 3, 4:
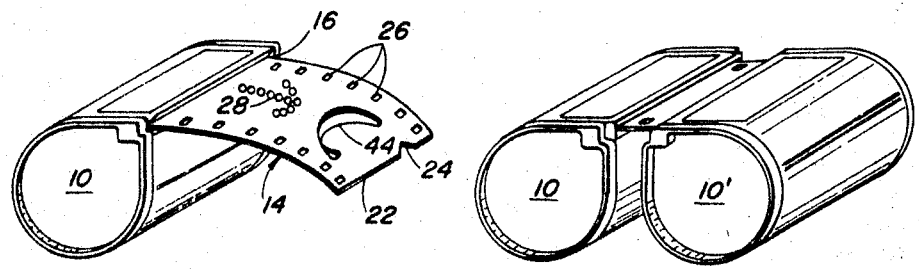
FIG. 3 is a perspective view of the supply cartridge shown in FIG. 1.
FIG. 4 is a perspective view of the supply cartridge and the take-up cartridge joined together as a unit package by the film extending therebetween.

The present invention provides indicia on a film cartridge, each indicium corresponding to a different type of film which may be loaded within the cartridge, and a mark in a predetermined location on the free end portion of the film, for cofunctioning with one of the indicia to identify the film in the cartridge.

Referring to FIGS. 1 through 5, a film cartridge 10, is shown with a free end portion 12 of film 14 extending from the film gate 16 of the cartridge. Several indicia 18 corresponding to different types of film which the cartridge may contain are provided on the surface 20 of cartridge 10 near the film gate 16. Although the indicia are shown in the form of abbreviated words, they may be in other forms. These indicia may be printed directly on the cartridge, embossed therein, printed on a label affixed thereto, or placed on the cartridge by any suitable means. Furthermore, the indicia may be located adjacent one or the other or both sides of the film gate, and may extend either partially or fully around the cartridge. The end edge 22 of the free end portion 12 of the film 14 is provided with an identifying notch 24 which aligns longitudinally with that one of the indicia 18 which corresponds to that type of film in the cartridge. Any easily observed mark can be used instead of the notch 24, such as printed, embossed, or perforated mark or line on the end portion of the film. The film 14 may also be provided with perforations 26 for engagement with drive sprockets 38 of camera 36, and an arrow 28 to indicate the direction that the film 14 should be moved.

In FIG. 2 the end edge 30 of the trailing free end portion 32 of film 14' is provided with a film identifying notch 34 which aligns with one of the indicia 12' near film gate 16' on the take-up cartridge 10' to identify the type of film wound in the cartridge. The notch 34 can also be replaced by any suitable mark or line provided on the end portion of the film.

Figure 6:
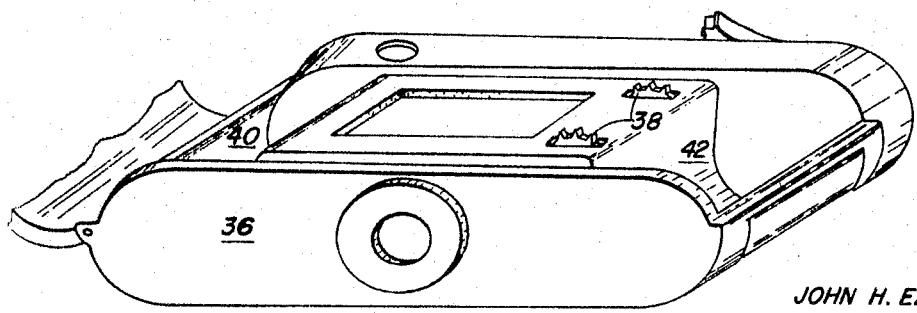
FIG. 6 shows a perspective view of a camera ready to receive the pair of cartridges illustrated in FIG. 5.

The camera 36 shown in FIG. 6 is a well known type, and includes a compartment 40 for receiving a film supply cartridge, a compartment 42 for receiving a film take-up cartridge, and drive sprockets 38 for engaging the perforations 26 on the film.

The operation of the preferred embodiment of the invention will now be described. The photographer inserts the free end portion 12 extending from the gate 16 of the supply cartridge 10 into the gate 16' of take-up cartridge 10'. The free end portion may be provided with suitable means, such as the semi-circular cut-out shown at 44, for preventing the free end portion from being accidentally withdrawn from the take-up cartridge. Should there be any doubt whether the cartridge 10 is indeed the supply cartridge, the arrow 28 in the free end portion 12 clearly shows that the film 14 is intended to be drawn from the cartridge. The photographer can easily identify the film 14, in accordance with the concept of this invention, by noting the longitudinal alignment of the notch 24 with one of the indicia 18 to see which type of film is indicated.

Figure 5:
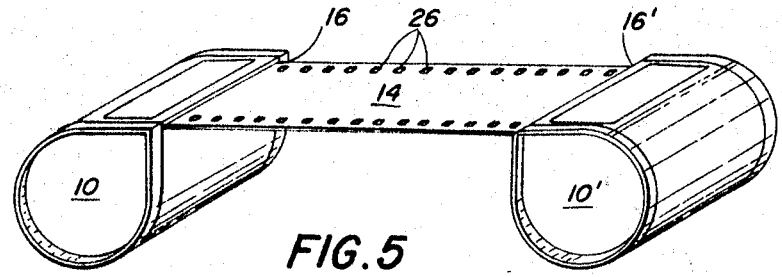
FIG. 5 is a perspective view of the cartridges shown in FIG. 4 separated for insertion into the camera.

The two cartridges 10 and 10' are now separated the proper distance, as shown in FIG. 5, for insertion into compartments 40 and 42 of camera 36. After the film 14 has been exposed and advanced into the take-up cartridge 10', the take-up cartridge 10' is removed from the camera 36. The empty supply cartridge 10 is now inverted and placed in the take-up compartment 42 of the camera 36 to serve as the take-up cartridge for a fresh roll of film. The notch 34 on the free end portion 32 of the film 14' is in line with one of the indicia 12' on the take-up cartridge 10', thus providing ready means for identification of the exposed film for the photographer as well as the film processor.

The invention has been described in detail with particular reference to preferred embodiments thereof, but it will be understood that variations and modifications can be effected within the spirit and scope of the invention as described hereinabove and as defined in the appended claims.

I claim:
1. Apparatus comprising:
 (a) a film cartridge for use in a camera;
 (b) film for exposure in the camera, said film being at least partially carried within said cartridge;
 (c) a plurality of indicia on said cartridge, said indicia being spaced relative to each other transversely of the longitudinal film axis; and
 (d) an index on said film having a variable transverse position relative to the longitudinal film axis depending on the type of film, whereby alignment of said index with one of said indicia serves to indicate the type of film in said cartridge.

2. Apparatus as defined in claim 1 further comprising a film gate on said cartridge through which said film may be fed and wherein said indicia is located on said cartridge adjacent said film gate.

3. Apparatus as defined in claim 2 wherein one end of said film may extend from said film gate, and said index is on said one end of said film.

4. Apparatus as defined in claim 3 wherein said index is a notch in said film.

5. Apparatus as defined in claim 1 wherein said index is a notch in said film.

References Cited

UNITED STATES PATENTS 1,889,258  11/1932  MacDonald _____ 206—40.5 X

JOHN M. HORAN, Primary Examiner